United States Patent Office 3,778,399
Patented Dec. 11, 1973

3,778,399
NOVEL EMULSION ADHESIVE COMPOSITIONS OF VINYL ACETATE POLYMERS
Chris T. Fazioli, La Grange Park, Ill., and Julius Sirota, South Plainfield, and Richard A. Weidener, Berkeley Heights, N.J., assignors to National Starch and Chemical Corporation, New York, N.Y.
No Drawing. Continuation-in-part of abandoned application Ser. No. 810,792, Mar. 26, 1969. This application May 6, 1971, Ser. No. 141,007
Int. Cl. C08f 45/26
U.S. Cl. 260—29.6 ME    4 Claims

ABSTRACT OF THE DISCLOSURE

Novel, high solids, adhesive compositions based on an emulsion of a homo- or copolymer of vinyl acetate are described wherein the continuous phase of the emulsion comprises an essentially non-volatile, water soluble liquid or a mixture of water and an essentially non-volatile, water soluble liquid. The novel adhesive compositions are particularly suited for use in the manufacture of window envelopes whereby a transparent patch, or window, is adhered onto the face of the envelope blank.

RELATED APPLICATIONS

This application is a continuation-in-part of our copending application Ser. No. 810,792, filed Mar. 26, 1969, and assigned to the assignee of the instant application, now abandoned.

This invention relates to novel, high solids, adhesive compositions comprising emulsions of homo- or copolymers of vinyl acetate which are formulated so as to be particularly useful as adhesives in the manufacture of window envelopes by means of high-speed envelope making machinery.

The use of conventional, aqueous emulsion based envelope adhesives presents the envelope manufacturer with a serious and recurring problem with respect to maintaining the viscosity of the adhesive system during the manufacturing process. Because they are exposed to the air, are in constant agitation, and their temperature is increased because of heat generated through friction, conventional adhesive systems will lose water and will, therefore, undergo a rapid increase in their viscosity. This phenomenon is particularly troublesome on high-speed machines and makes certain envelope constructions either impossible to prepare or, at best, results in a drastic reduction in machine speeds, thus severely limiting the usefulness of such high-speed equipment.

As ordinarily supplied, these conventional adhesives have a very low viscosity and their films provide very little tack. However, they gradually increase in viscosity with an accompanying increase in tack, thus requiring dilution by the addition of water. If this dilution is not carefully controlled, excessive thinning may result and thereby destroy the ability of the adhesive to function as intended. For example, the system may be so thin that it will not transfer sufficient adhesive to effect a bond or, if transferred, it may be so thin that it will penetrate excessively into the paper substrate without leaving sufficient solids at the interface to effect the bond.

In addition, conventional, aqueous emulsion adhesives tend to dry on the rollers during machine shut down periods and become excessively tacky, requiring extensive cleaning before production can be resumed. In addition, when prepared so as to contain a low solids content, these conventional, aqueous emulsion adhesives may cause excessive puckering or distortion of the envelope due to the swelling and contraction of the paper fibers which is caused by the presence of high concentrations of water in the adhesive system.

It is, accordingly, a primary object of this invention to provide emulsion systems based on homo- or copolymers of vinyl acetate which are especially effective as window patch adhesives for the manufacture of window envelopes.

A further object of this invention is to prepare such adhesive compositions with relatively low concentrations of water so as to stabilize machining viscosity and minimize or eliminate the occurrence of warping or puckering as well as the excessive penetration of moisture into the paper substrate. Another object is to provide adhesives which have no tendency to dry on the surfaces of the manufacturing apparatus, i.e. to "film." A still further object is to provide adhesive compositions which can bond a wide variety of substrates and which are, therefore, useful in many different end use applications.

These objects are accomplished by provivding adhesive compositions comprising (a) from about 20 to 52%, by weight, of polymer solids derived from an aqueous emulsion of a homo- or random copolymer of vinyl acetate in dispersed, particulate, non-dissolved form; (b) from 0 to about 32%, by weight, of a plasticizer; and, (c) from about 35 to 55%, by weight, of a non-volatile, water soluble liquid; the aforesaid percentages being based upon the combined total weight of the solids derived from each of the latter three classes of ingredients, i.e. from (a), (b), and (c). The compositions may also contain water in a concentration ranging from 0 to about 25%, by weight, based upon the total weight of the resulting water containing composition.

As used in this invention, the phrase "high solids, adhesive compositions" denotes adhesive compositions containing a concentration of water which is less than about 25% of the total weight of the composition.

In more detail, the polymers suitable for use in preparing the novel adhesives of this invention include polyvinyl acetate and random copolymers of vinyl acetate with one or more monomers selected from the group consisting of (a) the alkyl esters of acrylic and methacrylic acids, wherein said alkyl group contains from 1 to about 10 carbon atoms, such, for example, as methyl acrylate, butyl acrylate, 2-ethylhexyl acrylate, and the corresponding methacrylate esters; (b) vinyl and vinylidene halides, such, for example, as vinyl chloride and vinylidene chloride; (c) ethylenically unsaturated monocarboxylic acids, such for example, as acrylic, itaconic, citraconic, and crotonic acids; (d) nitriles of ethylenically unsaturated monocarboxylic acids, such for example, as acrylonitrile; (e) ethylenically unsaturated dicarboxylic acids, such, for example, as maleic and fumaric acids; (f) anhydrides of ethylenically unsaturated dicarboxylic acids, such, for example, as maleic anhydride; (g) the $C_1$–$C_4$ alkyl half esters of maleic and fumaric acids, such, for example, as methyl hydrogen maleate; (h) the dialkyl esters of ethylenically unsaturated dicarboxylic acids, wherein said alkyl group contains from 1 to about 8 carbon atoms, such, for example, as dibutyl maleate; and (i) ethylene. The vinyl acetate content of these copolymers should be at least about 20%, by weight, of the copolymer.

Both the homo- and random copolymers of vinyl acetate suitable for use in these adhesive compositions can be prepared by methods well known in the art. Thus, the polymerization of such homo- and copolymers can be carried out by means of free radical initiated polymerization procedures wherein the vinyl acetate or a mixture of vinyl acetate with one or more comonomers is heated in the presence of a free radical initiators such as azobisisobutyronitrile or benzoyl peroxide. Optionally, the polymerization may be carried out in the presence of some or all of the non-volatile, water soluble liquid which is to be contained in the final composition. Ordinarily, however, the homo- and copolymers of vinyl acetate are prepared in aqueous emulsion form wherein the resulting polymer emulsions have a resin solids content ranging from about 45 to 60%, by weight. Furthermore, the polymers used in the compositions of this invention should have an average particle size ranging from about 0.5 to 7 microns.

While this disclosure has emphasized the use of random copolymers of vinyl acetate in the novel adhesives of this invention, it is contemplated that block and graft polymers, as well as mixtures of such polymer types, could likewise be utilized in these compositions if so desired.

The plasticizers which can be used in the adhesive compositions of this invention include (a) chlorinated polyphenyls having a specific gravity of about 1.62 to 1.63; (b) organic phosphate esters such as triphenyl phosphate; (c) high molecular weight polyesters such as the polyesters resulting from the condensation of polybasic organic acids, such as adipic, sebacic and terephthalic acids, with polyhydric alcohols, such as ethylene glycol, or with polyamines, such as hexamethylene diamine; (d) organic esters of triethylene glycol such as triethylene glycol di(2-ethylbutyrate) and triethylene glycol di(2-ethylhexanoate); (e) phthalyl substituted glycolates such as methyl phthalyl ethyl glycolate and butyl phthalyl butyl glycolate; (f) phthalic acid esters such as dibutyl phthalate, dimethoxyethyl phthalate, and dibutoxyglycol phthalate; (g) low molecular weight polyethylene glycols; and (h) phenyl ethers of polyethylene glycol.

Other types of plasticizers may also be used provided that they are compatible with the vinyl acetate polymer that is present in the adhesive composition. These plasticizers serve to supplement the inherent plasticity or tackiness of the vinyl acetate polymer and, as would be expected by those skilled in the art, a higher concentration of plasticizer will ordinarily be incorporated into the adhesive composition when harder polymers are used whereas lower concentrations of plasticizer will be incorporated when softer polymers are used. Thus, when utilizing harder polymers, such as polyvinyl acetate, or polymers having a hardness value of about 42 or higher, as determined by the Sward Rocker Hardness test, a plasticizer concentration of about 32%, by weight, is preferred. With the softer polymers, such as polymers having a hardness value of about 2 or less, the use of a plasticizer concentration of 0 to about 4%, by weight, is sufficient.

It can be seen, therefore, that adhesive compositions for particular end-use applications wherein certain properties are desired can easily be formulated so as to contain all of the components within the previously specified concentration ranges. These variations in the products of this invention are attained, primarily, by varying the type of polymer employed and/or the concentration of the plasticizer.

The non-volatile, water soluble liquids, hereinafter referred to as "vehicle modifiers," which are required as part of the continuous phase of the novel adhesive compositions of this invention, generally comprise liquids having a boiling point which is above 130° C. These liquids must be soluble in water so that at least 50 parts, by weight, of the liquid will dissolve in 100 parts, by weight, of water at room temperature. Additionally, these liquids should be non-solvents for the vinyl acetate polymer to the extent that no more than about 10 parts, by weight, of the polymer solids can be dissolved in 100 parts, by weight, of the vehicle modifier at room temperature. These liquids may not be strongly acidic or basic and must be inert with respect to the other components of the composition which are present. Liquids meeting these requirements include, for example, $C_2$-$C_6$ glycols such as trimethylene glycol, ethylene glycol, diethylene glycol, triethylene glycol, propylene glycol, dipropylene glycol, butylene glycol, hexalene glycol and 1,5 pentanediol; tetraethylene glycol; $C_3$-$C_6$ trihydroxyalkanes such as glycerin, butanetriol and hexanetriol; and sorbitol and mannitol derivatives. If desired, the adhesives can be prepared with mixtures of two or more of the latter liquids. These "vehicle modifiers" function primarily to reduce or completely replace the water which is present in the adhesive and thus constitute a novel and functional component thereof.

Water may be present in the novel adhesive compositions of this invention in concentrations ranging from about 0 to about 25%, by weight. While compositions which are essentially devoid of water are feasible and are effective as adhesives, it is preferable to employ compositions having a concentration of water within the range of about 3 to 12%, by weight. It has been found in practice that compositions containing water within this preferred range display excellent tack and produce superior adhesive bonds.

The novel adhesive compositions of this invention can be prepared by means of several different procedures. For example, according to one procedure, the selected vinyl acetate homo- or copolymer emulsion is first admixed with the desired plasticizer. When the resulting mixture is homogeneous, the vehicle modifier is slowly admixed therewith so as to avoid breaking the emulsion. Stirring is continued so as to produce a homogeneous blend. At this point, depending upon the concentration of resin solids in the vinyl acetate polymer as well as on the concentration in which the various other components of the adhesive are present, the composition can be immediately utilized without any further processing steps being required.

However, if the concentration of water in the adhesive is too high, it may be readily lowered by evaporation. Thus, evaporation may be accomplished by heating the composition, under agitation, to a temperature of approximately 180° to 190° F., and maintaining it at that level while a stream of air is played across its surface. Essentially waterless compositions may be obtained in this manner. Of course, the evaporation step may be terminated at any point so as to yield a composition having any desired concentration of water. Alternatively, water may be added to compositions from which part or all of the water had previously been removed by evaporation so as to thereby raise the concentration of water to any desired level.

Optionally, as noted hereinabove, part or all of the vehicle modifier may be incorporated into an essentially non-aqueous polymerization system utilized for the initial preparation of the homo- or copolymers of vinyl acetate. The polymer emulsions obtained from polymerizing such a system would thereby contain a vehicle modifier as a component of the original emulsion and can be conveniently utilized in preparing the novel adhesives of this invention. If only a portion of the required vehicle modifier is thus incorporated, additional vehicle modifier may subsequently be added as described hereinabove.

In those instances where compositions containing polyvinyl acetate emulsions are being evaporated, it is likely that hydrolysis of the polymer may occur to some degree. The resultant adhesive composition would thus contain small concentrations, no greater than about 10%, by weight, of polyvinyl alcohol as well as other partial hydrolysis products of polyvinyl acetate. The properties of such adhesive compositions are not appreciably altered by the presence of the latter components.

It is to be noted that upon completion of their preparation, the adhesive compositions of this invention should have a viscosity from about 500 to 25,000 centipoises at 22° C. Compositions having a viscosity which is not within the latter range will ordinarily be unsuitable for use as adhesives on high-speed envelope making machinery. The compositions may, if desired, contain a variety of optional ingredients, such, for example, as defoamers, dyes, surfactants, volatile organic solvents, preservatives, thickeners, fillers and the like.

Although the adhesive compositions of this invention have been cited as being particularly suitable for use in the manufacture of envelopes, it should be noted that they may also be used in a wide variety of bonding applications such, for example, as packaging and bottle labeling, with a wide variety of substrates. However, since the excellent tack and adhesion which is achieved in these novel compositions is believed, at this time, to result from the wicking of the vehicle modifier into the substrate, it is essential that at least one of the substrates being adhered is a porous substrate capable of absorbing said vehicle modifier. Thus, under conditions where this wicking phenomenon is not possible, as where a film of the adhesive composition is utilized to bond two glass plates, it will be observed that the adhesive does not develop any appreciable tack or adhesion.

Among the porous substrates which may be utilized with the novel adhesives of this invention are included: paper, paperboard, textiles, leather, wood, and the like. These porous substrates may then be bonded or laminated to a virtually unlimited variety of substrates including, in addition to the porous substrates specified hereinabove, cellophane; cellulose acetate; glass; rubber; plastic films and sheets such as those derived from polystyrene, polyethylene terephthalate, polyethylene, polypropylene, polyvinyl chloride and polyvinylidene chloride; and metal sheets and foils. In using these novel adhesives, they may be applied to the substrates by any conventional coating technique such as mechanical coating or spraying. It is preferred that the adhesive film be applied to the porous substrate and that the second substrate then be brought ino face-to-face contact with the adhesive coated porous substrate.

For use in the manufacture of envelopes, the adhesive compositions of the present invention can be readily applied to the porous substrate by means of any conventional high-speed envelope making machinery. The compositions should be applied in dry film thicknesses of about 0.2 to 2 mils. The thus applied coatings may be dried by the use of any of the drying equipment ordinarily utilized in the industry. The porous substrates typically utilized in envelope manufacture are paper and paperboard. The substrates which may be bonded thereto include paper, paperboard, and those utilized as the transparent window patch in window envelopes such as glassine, cellophane, cellulose acetate, polystyrene, polyethylene terephthalate, polyethylene, polypropylene, and the like, as well as treated and coated modifications thereof.

The use of the novel adhesives of this invention results in the manufacture of flat envelopes which are devoid of any tendency to curl and whose adhesive bonds are characterized by their high degree of strength. Furthermore, as a result of their unique composition, these novel adhesives offer the distinct advantages of not tending to thicken during use and of not drying in the gum box or on the coating rollers or other surfaces of the envelope making machinery. Thus, there is no need for intermittent dilution of the product, and production may be interrupted for considerable periods of time without causing delays due to the need for extensive cleaning of the equipment before production can be resumed. The absence of such excessive drying during use is in direct contrast to presently available envelope adhesives which inherently display a strong tendency to film or skin in the gum box and on other surfaces of the machinery when production is interrupted or terminated.

The following examples will more fully illustrate the embodiment of this invention. In these examples all parts given are by weight unless otherwise noted.

Example I

This example illustrates the preparation of a typical adhesive composition of this invention by means of a procedure wherein it was not necessary to utilize an evaporation step in order to reduce the concentration of water in the system.

A tank equipped with means for mechanical agitation was charged with: (1) 40 parts of an aqueous emulsion of polyvinyl acetate containing 55%, by weight, of resin solids, and (2) 26 parts of a high molecular weight adipic acid polyester plasticizer. The two components were blended for a period of about 20 minutes after which time 34 parts of ethylene glycol was admixed therewith over a period of 15 minutes. Stirring was continued until the mixture was homogenous. At this point, the composition contained about 22%, by weight, of polyvinyl acetate resin solids; 26%, by weight, of plasticizer, 34%, by weight, of vehicle modifier; and 18%, by weight, of water. The viscosity of the solution was 500 centipoises and the composition was immediately used as an adhesive for the manufacture of window envelopes on a conventional high-speed envelope machine with no further processing steps being required. No problems with either viscosity or filming were encountered.

Example II

This example illustrates the preparation of a typical adhesive of this invention wherein an evaporation step was utilized in order to produce an essentially waterless composition.

A steam jacketed tank equipped with means for mechanical agitation was charged with: (1) 63.6 parts of an aqueous emulsion of a vinyl acetate:dibutyl maleate (77:23) copolymer having a resin solids content of 55% solids, by weight, and (2) 20 parts of dimethoxyethyl phthalate. The latter two components were blended for a period of about 20 minutes after which time 60 parts of glycerin were admixed therewith over a period of 20 minutes. Stirring was continued until the mixture was homogenous. The composition was then heated to 185° F. and, while under agitation, maintained at that level while a stream of air was directed onto its surface for a period of about 4 hours. The resulting product was essentially waterless and had a viscosity of about 25,000 cps. at 22° C.

The resulting adhesive composition demonstrated good wet tack along with excellent adhesive and machining properties when used to bond cellophane and polyethylene terephthalate patches to white woven envelope blanks on high-speed equipment. Moreover, the composition was entirely devoid of any tendency to film or skin.

Example III

This example illustrates the preparation of a typical adhesive composition of this invention.

A steam jacketed tank, which was equipped with means for mechanical agitation, was charged with: (1) 60 parts of an aqueous emulsion of a vinyl acetate dibutyl maleate (77:23) copolymer having a resin solids content of 55% solids, by weight, and (2) 18.5 parts of a high molecular weight adipic acid polyester plasticizer. The two components were blended for a period of 20 minutes after which time 48.5 parts of glycerin was admixed therewith over a period of 15 minutes. Stirring was continued for about 5 minutes until the mixture was homogenous. At this point the composition contained about 26%, by weight, of copolymer solids, 14.6%, by weight, of plasticizer; 38.1%, by weight, of vehicle modifier; and 21.3%, by weight, of water. However, the viscosity of the composition was less than 400 cps. at 22° C., which was below the lower limit of the viscosity range specified hereinabove. As a result, the composition was too thin for use on high-speed envelope making machinery.

In order to raise the viscosity of the composition, a reduction in its water content was required. To effect such a reduction, the composition was heated to 185° F. and, while under agitation, maintained at that level while a stream of air was directed onto its surface for a period of about 4 hours which resulted in the preparation of an essentially waterless composition. The product, at this stage, was homogenous but had a viscosity of about 120,000 cps. at 22° C. which, again, was outside of the specified viscosity range. Accordingly, water was added in an amount sufficient to produce a final concentration of water in the composition of about 5%, by weight, thereby reducing its viscosity to about 25,000 cps. at 22° C.

The resulting composition possessed good wet tack and adhesive properties when used to seal glassine and polystyrene patches to white woven envelope blanks on a conventional high-speed envelope machine. No viscosity problems were encountered during a machine-run of 7 hours as the viscosity of the adhesive system remained essentially constant during the entire period. At the end of the run, the adhesive composition was deliberately left in the gum box for a period of about 16 hours while the coating rollers were left uncleaned for the same period. Nonetheless, on resuming production, it was found that the rollers and other surfaces of the equipment were devoid of any traces of the dried adhesive product.

Example IV

This example illustrates the preparation of a number of different adhesive compositions typical of this invention wherein a variety of specified components over a broad range of proportions were respectively utilized in their formulation.

In each instance, the compositions described below were prepared by means of the procedure set forth in Example I hereinabove and each was subsequently subjected to an evaporation step, if necessary, to a point wherein their respective water contents and viscosities were within the specified range. Each of the thus prepared compositions possessed good tack, bonding, and machining properties comparable to those of the composition of Example III hereinabove.

dispersed, particulate, non-dissolved form, said copolymers of vinyl acetate containing at least about 20%, by weight, of vinyl acetate and at least one comonomer selected from the group consisting of (a) alkyl esters of acrylic and methacrylic acids wherein said alkyl group contains from 1 to about 10 carbon atoms; (b) vinyl and vinylidene halides; (c) ethylenically unsaturated monocarboxylic acids; (d) nitriles of ethylenically unsaturated monocarboxylic acids; (e) ethylenically unsaturated dicarboxylic acids; (f) anhydrides of ethylenically unsaturated dicarboxylic acids; (g) $C_1$–$C_4$ alkyl half esters of maleic and fumaric acids; (h) dialkyl esters of ethylenically unsaturated dicarboxylic acids wherein said alkyl group contains from 1 to about 8 carbon atoms; and, (i) ethylene;

(2) from 0 to about 32%, by weight, of a plasticizer;

(3) from about 35 to 55%, by weight, of a water soluble liquid which is inert with respect to the other ingredients in the composition and which has a boiling point above 130° C. and in which the vinyl acetate polymer is substantially insoluble selected from the group consisting of $C_2$–$C_6$ glycols, tetraethylene glycol, $C_3$–$C_6$ trihydroxyalkanes, sorbitol and mannitol derivatives, and mixtures thereof; the latter concentrations being based upon the total weight of the solids derived from each of (1), (2), and (3); and, (4) from 0 to about 25% of water, based upon the total weight of the composition.

2. The composition of claim 1, wherein said plasticizer is selected from the group consisting of (a) chlorinated

TABLE I

| Formulation No. | Aqueous emulsion polymer | Sward rocker hardness value of polymer | Parts, polymer emulsion | Plasticizer | Parts, plasticizer | Vehicle modifier | Parts, vehicle modifier |
|---|---|---|---|---|---|---|---|
| 1 | Vinyl acetate:butyl acrylate (65:35) 55% resin solids, by weight. | 6 | 82 | High M-W-adipic acid polyester.[1] | 6.5 | Propylene glycol | 48.5 |
| 2 | Vinyl acetate:butyl acrylate (25:75) 52% resin solids, by weight. | 0 | 100 | | | Glycerin | 48 |
| 3 | Vinyl acetate:ethyl acrylate (87:13) 56% resin solids, by weight. | 30 | 46 | Butyl phthalyl butyl glycolate | 2.5 | do | 48.5 |
| 4 | Vinyl acetate:methyl methacrylate (87:13) 55% resin solids, by weight. | 45 | 46 | Dibutyl phthalate | 34 | Ethylene glycol | 46 |
| 5 | Vinyl acetate:dibutyl fumarate (35:65) 51% resin solids, by weight. | 0 | 60 | Triethylene glycol Di(2-ethylbutyrate). | 2 | Triethylene glycol | 35 |
| 6 | Polyvinyl acetate 55% resin solids, by weight. | 40 | 36 | Butyl phthalyl butyl glycolate | 31.5 | Glycerin | 48.5 |
| 7 | Vinyl acetate:crotonic acid (83:17) 55% resin solids, by weight. | 42 | 60 | Dibutyl phthalate | 32 | Diethylene glycol | 35 |
| 8 | Vinyl acetate:dibutyl maleate (77:23) 55% resin solids, by weight. | 16 | 54 | High M.W. adipic acid polyester.[1] | 16 | Glycerin | 55 |
| 9 | do | 16 | 63.6 | Dimethoxyethyl phthalate | 20 | Blend of $C_3$–$C_6$ glycols [2] | 60 |

[1] As sold by Cambridge Industries Co., Cambridge, Mass. under trade name Resolflex R296.
[2] As sold by Atlas Chemical Co. under trade name Sutro #100.

Summarizing, it is seen that this invention provides novel, high solids, adhesive compositions which are particularly suited for use as adhesives in the manufacture of window envelopes.

Variations may be made in proportions, procedures and materials without departing from the scope of this invention which is limited only by the following claims.

What is claimed is:

1. An adhesive composition for bonding at least two solid substrates, at least one of which is a porous substrate, said adhesive composition consisting essentially of:

(1) from about 20 to 52%, by weight, of polymer solids derived from an aqueous emulsion polymer selected from the group consisting of the aqueous emulsion homo- and copolymers of vinyl acetate in polyphenyls; (b) organic phosphate esters; (c) high molecular weight polyesters; (d) organic esters of triethylene glycol; (e) phthalyl substituted glycolates; (f) phthalic acid esters; (g) low molecular weight polyethylene glycols and (h) phenyl ethers of polyethylene glycol.

3. A high solids adhesive composition for bonding at least two solid substrates, at least one of which is a porous substrate, said adhesive composition consisting essentially of:

(1) 33 parts, by weight, of polymer solids derived from an aqueous emulsion of a vinyl acetate:dibutyl maleate (77.23) copolymer;

(2) 18.5 parts, by weight, of a high molecular weight adipic acid polyester plasticizer;

(3) 48.5 parts, by weight, of glycerin, and
(4) from about 0 to 12 parts, by weight, of water.

4. A high solids adhesive composition for bonding at least two solid substrates, at least one of which is a porous substrate, said adhesive composition consisting essentially of:
 (1) 19.8 parts, by weight, of polymer solids derived from an aqueous emulsion of polyvinyl acetate;
 (2) 31.5 parts, by weight, of butyl phthalyl butyl glycolate;
 (3) 48.5 parts, by weight, of glycerin, and
 (4) from about 0 to 12 parts, by weight, of water.

References Cited

UNITED STATES PATENTS

| 2,387,967 | 10/1945 | Zimmerman | 260—29.6 ME |
| 2,588,543 | 3/1952 | Kunze et al. | 260—29.6 ME |
| 2,595,952 | 5/1952 | Kunze et al. | 260—29.6 ME |
| 3,287,290 | 11/1966 | Bray | 260—29.6 ME |

LUCILLE M. PHYNES, Primary Examiner

U.S. Cl. X.R.

260—29.6 E, 33.4 R; 156—327; 161—251